Patented July 15, 1947

2,423,871

UNITED STATES PATENT OFFICE 2,423,871

DEPOSITED NEOPRENE LATEX ARTICLES

Philip D. Brass, Cranston, R. I., assignor to United States Rubber Company, New York, N. Y., a corporation of New Jersey No Drawing. Application October 11, 1944, Serial No. 558,293

6 Claims. (Cl. 117—138.8)

This invention relates to a method of increasing the resistance to aging of certain vulcanized, deposited neoprene latex articles.

"Neoprene latex," as is known, is an aqueous emulsion polymerizate of chloro-2-butadiene-1,3. The polymerized chloro-2-butadiene-1,3, or polychloroprene, is known as neoprene. The terms "neoprene" and "neoprene latex" as used herein have these conventional meanings.

Deposited neoprene latex articles are commonly made by dipping, spreading, spraying, or extrusion methods in which the neoprene particles are directly deposited from the compounded neoprene latex in the desired shape by means of a chemical coagulant, as for example, in the manufacture of gloves, caps, shoes, thread, sheeting, and the like. Zinc oxide is generally added to the neoprene latex in compounding the same and hydrochloric or other acid or zinc or other metal chloride is often used as the coagulant. Where zinc chloride is used as the coagulant, or where the neoprene latex compound contains zinc oxide, and an acid such as hydrochloric acid, or a salt such as a chloride is used as the coagulant, that is, where the deposited neoprene latex article contains zinc chloride from the coagulant or a soluble zinc salt from the reaction of zinc oxide in the neoprene latex with the coagulant, the article has poor aging characteristics, as shown by the conventional oxygen bomb accelerated aging test.

The present invention relates to improving the aging characteristics of such vulcanized, deposited neoprene latex articles by a simple treatment of the same. The treatment according to the present invention by which the aging characteristics of the article is improved also increases the modulus of the article, giving an often desired increased stiffness to the product.

According to the present invention, such vulcanized deposited latex articles are treated with gaseous ammonia. It is believed such treatment insolubilizes the soluble zinc salt, such as zinc chloride, possibly by metathetical reaction of the zinc chloride with the ammonia to form zinc oxide and ammonium chloride in the presence of a small amount of water which may accompany the ammonia gas or be added with it, or which may be left in the article on vulcanization or picked up by the article on exposure to the air after vulcanization by the hydroscopic zinc chloride. Regardless of the correctness or incorrectness of the above theory, the water-soluble content of deposited neoprene latex articles containing zinc chloride is decreased on treatment with ammonia. The treatment with gaseous ammonia is different in principle from aqueous leaching processes to remove water-solubles as generally recommended for deposited neoprene latex articles since it does not slowly wash out potentially beneficial materials but in a relatively short time converts the soluble zinc salt to an insoluble form with the attending improvement in aging characteristics and increased modulus.

The time of treatment with gaseous ammonia is not critical since the insolubilizing action of the ammonia on the zinc chloride is presumably instantaneous. The actual time of treatment, however, naturally depends on the physical characteristics of the articles, it being desirable to leave the ammonia gas in contact with the article for a sufficient time to penetrate to the various parts of the article. For example, treatment of thin dipped articles with gaseous ammonia for one to two hours is generally sufficient. With neoprene latex thread conventionally wound on spools from the vulcanizing operation, the time of treatment may desirably be up to 24 hours in order to allow ample time for the ammonia gas to diffuse into the interior of the spools. The present method of treating vulcanized deposited neoprene latex articles with gaseous ammonia has another very definite advantage over aqueous leaching processes in the treatment of thread, in that the thread may be treated while on spools with gaseous ammonia since the gas will penetrate into the interior of the spools, whereas with aqueous leaching processes it is necessary to remove the thread from the spools, make up into warps, soak in the aqueous leaching bath, dry, and re-spool. The present invention is illutrated in detail below with reference to the treatment of neoprene latex thread, but, as will be obvious, the principle of the present invention may be applied to any type of vulcanized, deposited neoprene latex articles.

A neoprene latex compound of the following composition was prepared by adding aqueous solutions or suspensions of the compounding ingredients to the neoprene latex in the conventional manner:

| | Parts dry weight |
|---|---|
| Neoprene latex (50% solids) | 100 |
| Zinc oxide | 5 |
| Carbon black | 10 |
| Soap | 2 |
| Wetting and dispersing agents | 1.5 |
| Antioxidant | 2 |
| Water to 50% solids. | |

The above compound was flowed through nozzles in the regular manner of making latex thread into a 15% aqueous hydrochloric acid solution in order to coagulate the neoprene latex in thread form, after which the thread was dried and vulcanized continuously at a temperature gradually rising to 300° F. in about 10 minutes, and then spooled. The spools were then piled at random in steel drums and a stream of gaseous ammonia was conducted into the drums in series from a conventional liquid ammonia cylinder for 18 hours. The improvements resulting from the ammonia treatment may readily be shown by comparison of the properties of the vulcanized thread with and without the ammonia treatment, as follows: The tensile strength of samples of thread not treated with ammonia dropped from 3450 pounds per square inch to 300 pounds per square inch on 144 hours aging in the oxygen bomb, whereas the tensile strength of thread treated with ammonia only dropped from 3020 pounds per square inch to 2290 pounds per square inch. The modulus at 500%, that is, the pull in pounds per square inch required to stretch the thread to six times its original length (500% elongation) was 900 pounds per square inch for the untreated thread and 1450 pounds per square inch for the ammonia treated thread, giving a desirable increase in stiffness of the thread. The water soluble zinc content of the thread was reduced from 1.50% (calculated as zinc oxide) to 0.09% by the ammonia treatment.

Thin neoprene articles were made by dipping aluminum forms into the above neoprene latex compound and then into a 15% aqueous hydrochloric acid solution to coagulate the latex. The articles were air dried overnight and then vulcanized for 45 minutes in air at 260° F. The thickness of the article varied from .015 to .023 inch. The vulcanized articles were stripped from the forms and suspended for varying lengths of time in a closed can over 28% commercial aqueous ammonia solution. The tensile strength of the untreated vulcanized articles ranged from about 1900 to 2100 pounds per square inch. The articles treated with the gaseous ammonia were aged 144 hours in the oxygen bomb and tensile strength measurements were then taken, with the results shown in the following table:

| Time of Treatment with Gaseous Ammonia | Tensile Strength (lbs. per sq. in.) after 144 hours in Oxygen Bomb |
|---|---|
| 10 minutes | 1,610 |
| 25 minutes | 1,420 |
| 45 minutes | 1,590 |
| 60 minutes | 2,340 |
| 120 minutes | 2,300 |

The above clearly shows the advantages of gaseous ammonia treatment of vulcanized, deposited neoprene latex articles.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the resistance to aging of vulcanized, cast or extruded deposited neoprene latex articles containing a water soluble zinc salt formed during the casting or extrusion of the polychloroprene, which comprises treating said articles after vulcanization with gaseous ammonia for at least one hour to materially improve the aging characteristics of the vulcanized polychloroprene.

2. The method of increasing the resistance to aging of vulcanized, cast or extruded deposited neoprene latex articles containing zinc chloride formed during the casting or extrusion of the polychloroprene, which comprises treating said articles after vulcanization with gaseous ammonia from one to twenty-four hours, thereby rendering said zinc salt water-insoluble and stabilizing the polychloroprene.

3. The method of increasing the resistance to aging of vulcanized extruded neoprene latex thread containing a water soluble zinc salt formed during the extrusion of the polychloroprene, which comprises treating said thread after vulcanization with gaseous ammonia from one to twenty-four hours, thereby rendering said zinc salt water-insoluble and stabilizing the polychloroprene.

4. The method of increasing the resistance to aging of vulcanized extruded neoprene latex thread containing zinc chloride formed during the extrusion of the polychloroprene, which comprises treating said thread after vulcanization with gaseous ammonia for at least one hour to materially improve the aging characteristics of the vulcanized polychloroprene.

5. The method of increasing the resistance to aging of vulcanized extruded neoprene latex thread containing a water soluble zinc salt formed during the extrusion of the polychloroprene, which comprises treating said thread after vulcanization and while wound on spools with gaseous ammonia for at least one hour to materially improve the aging characteristics of the vulcanized polychloroprene.

6. The method of increasing the resistance to aging of vulcanized extruded neoprene latex thread containing zinc chloride formed during the extrusion of the polychloroprene, which comprises treating said thread after vulcanization and while wound on spools with gaseous ammonia from one to twenty-four hours, thereby rendering said zinc salt water-insoluble and stabilizing the polychloroprene.

PHILIP D. BRASS.

REFERENCES CITED

The following references are of record in the file of this patent:

UNITED STATES PATENTS

| Number | Name | Date |
|---|---|---|
| 1,354,123 | Muntz | Sept. 28, 1920 |
| 1,909,455 | Busse | May 16, 1933 |
| 1,947,759 | Cunningham | Feb. 20, 1934 |
| 1,986,106 | Gibbons et al. | Jan. 1, 1935 |
| 2,241,856 | Henstrom et al. | May 13, 1941 |
| 2,289,777 | Hazell | July 14, 1942 |
| 2,306,222 | Patnode | Dec. 22, 1942 |
| 2,201,931 | Sullivan | May 21, 1940 |
| 2,318,693 | Joyce et al. | May 11, 1943 |

FOREIGN PATENTS

| Number | Country | Date |
|---|---|---|
| 464,823 | Great Britain | Apr. 19, 1937 |
| 975 | Great Britain | 1913 |